US012743635B2

(12) United States Patent
Strasser et al.

(10) Patent No.: US 12,743,635 B2
(45) Date of Patent: Sep. 22, 2026

(54) SYSTEMS AND METHODS FOR AUTOMATED ROUTE PLANNING INCLUDING APPROXIMATING A PARETO FRONT

(71) Applicant: General Dynamics Mission Systems, Inc., Fairfax, VA (US)

(72) Inventors: Benjamin Strasser, Minneapolis, MN (US); Patrick Valentine Haggerty, St. Louis Park, MN (US); William Steven Singleton, Lantana, FL (US); Adam Gerber, Fort Wayne, IN (US); Melanie Grossman, Wolcottville, IN (US); Sandeep Rajdev, Fort Wayne, IN (US); Sydney Matthys, Eagan, MN (US)

(73) Assignee: General Dynamics Mission Systems, Inc., Fairfax, VA (US)

( * ) Notice: Subject to any disclaimer, the term of this patent is extended or adjusted under 35 U.S.C. 154(b) by 977 days.

(21) Appl. No.: 17/930,539

(22) Filed: Sep. 8, 2022

(65) Prior Publication Data

US 2024/0086722 A1 Mar. 14, 2024

(51) Int. Cl.
*G06N 3/126* (2023.01)
*G06N 20/00* (2019.01)

(52) U.S. Cl.
CPC ............. *G06N 3/126* (2013.01); *G06N 20/00* (2019.01)

(58) Field of Classification Search
CPC ................................ G06N 20/00; G01C 21/00
See application file for complete search history.

(56) References Cited

FOREIGN PATENT DOCUMENTS

WO WO-2021050284 A1 * 3/2021 ............. G06F 40/30

OTHER PUBLICATIONS

Sakcak et al., "Complete Path Planning That Simultaneously Optimizes Length and Clearance", 2021, 2021 IEEE International Conference on Robotics and Automation (ICRA), vol. 2021, pp. 10100-10106 (Year: 2021).*
Yi et al., "Homotopy-aware RRT*: Toward human-robot topological path-planning", 2016, 2016 11th ACM/IEEE International Conference on Human-Robot Interaction (HRI), vol. 11, pp. 279-286 (Year: 2016).*

(Continued)

*Primary Examiner* — Mariela Reyes
(74) *Attorney, Agent, or Firm* — Ingrassia Fisher & Lorenz, LLP

(57) ABSTRACT

Systems and methods are provided for generating solutions to decision analysis problems. The systems include a processor configured to: receive input data relating to a decision analysis problem, the input data including various parameters, wherein one or more of the parameters are in conflict, generate a plurality of the solutions based on the input data, wherein each of the plurality of solutions are from distinct homotopy classes, approximate a Pareto front using a multi-objective evolutionary algorithm, the Pareto front representing a collection of the plurality of the solutions that are not inferior to others of the plurality of the solutions in view of an entirety of the parameters in the input data, generate a course of action (COA) menu presenting solution architypes based on the Pareto front using a topological clustering algorithm, and display the COA menu on a visual display device.

12 Claims, 5 Drawing Sheets

(56) References Cited

OTHER PUBLICATIONS

Zio et al., "A clustering procedure for reducing the number of representative solutions in the Pareto Front of multiobjective optimization problems", 2011, European Journal of Operational Research, vol. 210 No. 3, pp. 624-634 (Year: 2011).*
Brunskill et al., "Topological mapping using spectral clustering and classification", 2007, 2007 IEEE/RSJ International Conference on Intelligent Robots and Systems, vol. 2007, pp. 3491-3496 (Year: 2011).*
Rice et al., "Multi-homotopy class optimal path planning for manipulation with one degree of redundancy", 2020, Mechanism and Machine Theory, vol. 149, pp. 1-22 (Year: 2020).*
Bhattacharya et al., "Path homotopy invariants and their application to optimal trajectory planning", 2018, Annals of Mathematics and Artificial Intelligence, vol. 84, pp. 139-160 (Year: 2018).*

* cited by examiner

SYSTEMS AND METHODS FOR AUTOMATED ROUTE PLANNING INCLUDING APPROXIMATING A PARETO FRONT

TECHNICAL FIELD

The present invention generally relates to decision analysis methods, and more particularly relates to systems and methods for automated decision analysis including analysis of problems having conflicting parameters.

BACKGROUND

A typical decision analysis involves balancing multiple, often conflicting, priorities to identify a course of action (COA). A standard decision solution involves identification of user priorities, computation of a scalar-valued objective function that reflects these priorities, and optimization of the objective function. This approach has several drawbacks, most notably the difficulty of reducing users' assessment of their own priorities into a normalized objective function. Multi-objective optimization methods attempt to address these shortcomings by considering each user priority separately, producing a large number of solutions representing different tradeoffs between them. However, many multi-objective methods may require significant computational resources rendering such methods as impractical.

Hence, there is an ongoing desire for improved decision analysis methods, especially methods that require less computational resources. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A system is provided for generating solutions to a decision analysis problem. The system includes a processor configured to: receive input data relating to a decision analysis problem, the input data including various parameters, wherein one or more of the parameters are in conflict, generate a plurality of the solutions based on the input data, wherein each of the plurality of solutions are from distinct homotopy classes, approximate a Pareto front using a multi-objective evolutionary algorithm, the Pareto front representing the collection of the plurality of the solutions that are not inferior to others of the plurality of the solutions in view of an entirety of the parameters in the input data, generate a course of action (COA) menu presenting solution architypes based on the Pareto front using a topological clustering algorithm, and display the COA menu on a visual display device.

A method is provided for generating solutions to a decision analysis problem. The method includes, by a processor: receiving input data relating to a decision analysis problem, the input data including various parameters, wherein one or more of the parameters are in conflict, generating a plurality of the solutions based on the input data, wherein each of the plurality of solutions are from distinct homotopy classes, approximating a Pareto front using a multi-objective evolutionary algorithm, the Pareto front representing a collection of the plurality of the solutions that are not inferior to others of the plurality of the solutions in view of an entirety of the parameters in the input data, generating a course of action (COA) menu presenting solution architypes based on the Pareto front using a topological clustering algorithm, and displaying the COA menu on a visual display device.

Another method is provided for generating solutions to a decision analysis problem. The method includes, by a processor: receiving input data relating to a route planning problem, the input data including various parameters including a starting location, a destination location, and one or more of constraints associated with the route planning problem that must be satisfied by each of a plurality of solutions to the problem, and objectives input by the user that are preferably satisfied but not required by each of the plurality of solutions, wherein one or more of the objectives are in conflict, generating the plurality of the solutions based on the input data using a reference frame topological graph algorithm, wherein each of the plurality of solutions are from distinct homotopy classes approximating a Pareto front using an multi-objective evolutionary algorithm, the Pareto front representing a collection of the plurality of the solutions that are not inferior to others of the plurality of the solutions in view of an entirety of the parameters in the input data, generating a course of action (COA) menu presenting solution architypes based on the Pareto front by using a topological clustering algorithm to organize the Pareto front into clusters representing the solution architypes, and generating a graphic user interface configured to provide the solution architypes as selectable options and displaying the COA menu on a visual display device.

Furthermore, other desirable features and characteristics of the system and methods will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
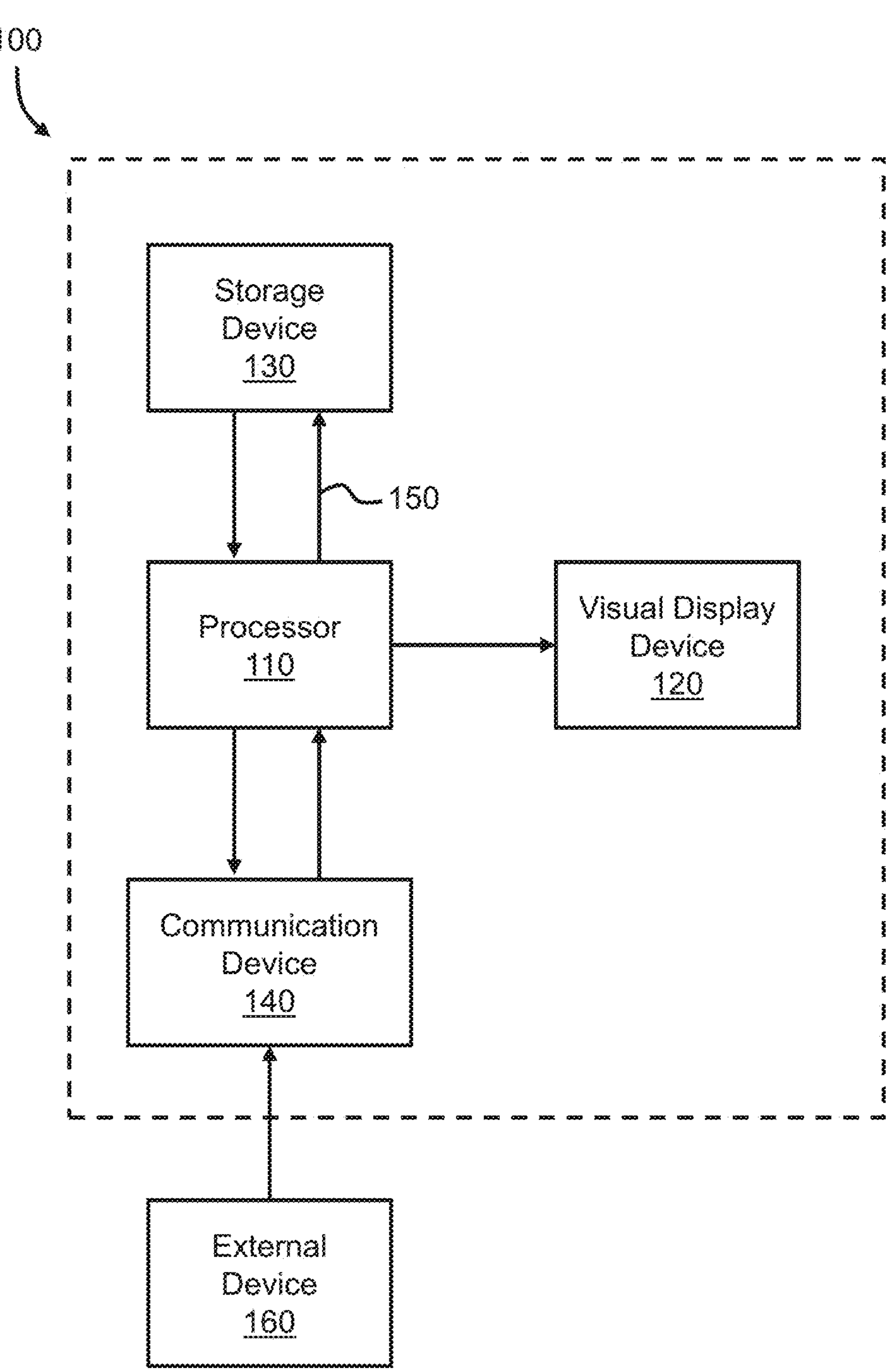
FIG. 1 is a functional block diagram of a system for decision analysis in accordance with an embodiment.

Initially referring to FIG. 1, a system 100 is provided for automated decision analysis. The system 100 is particularly suited to providing solutions to problems having multiple parameters (e.g., constraints, objectives, etc.) in which two or more of the parameters are in conflict. As used herein, a pair of parameters are considered to be in conflict if completing, satisfying, and/or improving one of the pair of parameters results in the other of the pair of parameters to be incomplete, unsatisfied, and/or diminished. The system 10 is particularly suitable for solving geometric-based problems. The system 100 includes a processor 110, a visual display device 120, a non-transitory computer readable storage device or media 130, a communication bus 150, and, optionally, a communication device 140.

The processor 110 can be any custom made or commercially available processor, a central processing unit (CPU), a graphics processing unit (GPU), an auxiliary processor among several processors associated with the computer system, a semiconductor-based microprocessor (in the form of a microchip or chip set), a macroprocessor, any combination thereof, or generally any device for executing instructions.

The bus 150 serves to transmit programs, data, status and other information or signals between the various components of the system 100. The bus 150 can be any suitable physical or logical means of connecting computer systems and components. This includes, but is not limited to, direct hard-wired connections, fiber optics, infrared, and wireless bus technologies.

The visual display device 120 is configured to visually display information of data provided by the processor 110, such as images, text, and/or video. In various embodiments, the visual display device 120 may be, but is not limited to, a light-emitting diode (LED) display (e.g., organic light-emitting diode (OLED), active-matrix organic light-emitting diode, etc.), a liquid-crystal display (LCD), a plasma display, a quantum dot display, or a cathode-ray tube (CRT) display.

The computer readable storage device 130 may include volatile and nonvolatile storage in read-only memory (ROM), random-access memory (RAM), and keep-alive memory (KAM), for example. KAM is a persistent or non-volatile memory that may be used to store various operating variables while the processor 110 is powered down. The computer-readable storage device 130 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor 110.

The instructions may include one or more separate programs, each of which comprises an ordered listing of executable instructions for implementing logical functions. The instructions, when executed by the processor 110, receive and process signals from a peripheral device functionally coupled to and/or in communication with the peripheral device interface, perform logic, calculations, methods and/or algorithms for automatically determining solutions to problems based on the logic, calculations, methods, and/or algorithms. Although only one processor 110 is shown in FIG. 1, embodiments of the system 100 can include any number of processors that communicate over any suitable communication medium or a combination of communication mediums and that cooperate to process the signals, perform logic, calculations, methods, and/or algorithms.

In various embodiments, one or more instructions of the system 100 are embodied in the system 100 and, when executed by the processor 110, receive and process the data in order to perform decision analysis processes.

The communication device 140 is configured to transmit and receive data between various components of the system 100, such as the processor 110, and an external device 160, such as a computing device, a controller, or various peripheral devices (e.g., keyboard or pointing device). For example, in various embodiments the communication device 140 includes a physical data port configured to couple with a data cable of, for example, an independent peripheral device to exchange data therewith. In various embodiments, the communication device 140 includes a transceiver device configured to wirelessly communicate with a remote computing device or controller.

As can be appreciated, that the system 100 may otherwise differ from the embodiment depicted in FIG. 1. For example, the system 100 may be coupled to or may otherwise utilize one or more remote computer systems and/or other control systems, for example as part of one or more of the above-identified devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 110) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments.

Figure 2:
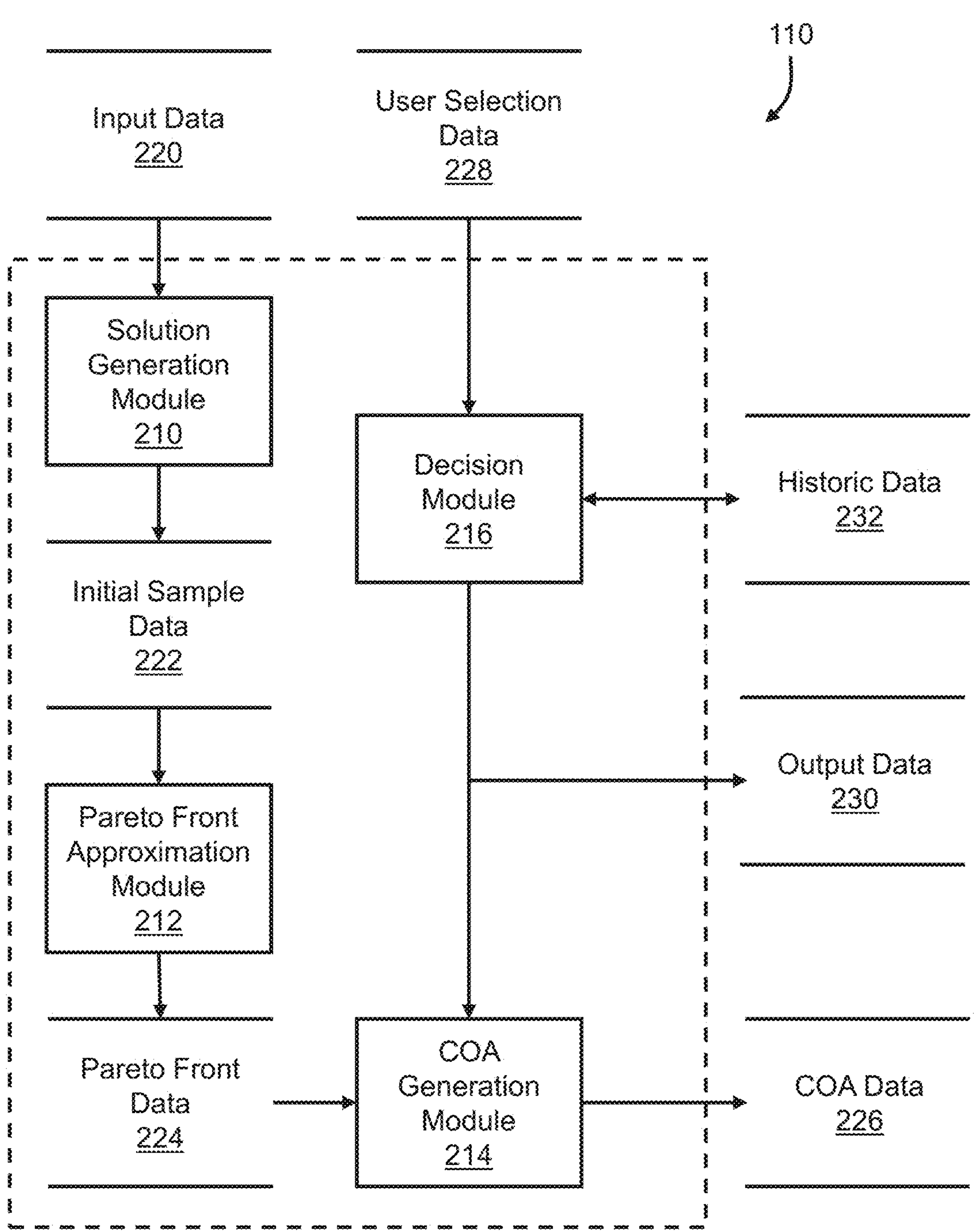
FIG. 2 is a dataflow diagram illustrating elements of the system of FIG. 1, in accordance with various embodiments.

With reference to FIG. 2 and with continued reference to FIG. 1, a dataflow diagram illustrates elements of the system 100 of FIG. 1 in accordance with various embodiments. As can be appreciated, various embodiments of the system 100 according to the present disclosure may include any number of modules embedded within the processor 110 which may be combined and/or further partitioned to similarly implement systems and methods described herein. Furthermore, inputs to the system 100 may be received from received from other control modules (not shown) associated with the system 100, and/or determined/modeled by other sub-modules (not shown) within the processor 110 of FIG. 1. Furthermore, the inputs might also be subjected to preprocessing, such as sub-sampling, noise-reduction, normalization, feature-extraction, missing data reduction, and the like.

In various embodiments, the system 100 includes a solution generation module 210, a Pareto front approximation module 212, a course of action (COA) generation module 214, and a decision module 216.

In various embodiments, the solution generation module 210 receives as input various input data 220 generated from an independent system, received from an independent computer readable storage device or media, and/or generated from user input, such as from the external device 160 coupled to the communication device 140. The input data 220 includes various data corresponding to the problem to be solved, such as but not limited to various parameters (e.g., constraints, objectives, etc.) of the problem. In certain embodiments, two or more of the parameters may be in conflict. In various embodiments, the parameters include one or more of constraints and/or objectives. As used herein, constraints refer to any parameter that must be satisfied by the solutions (i.e., either must occur or must not occur). Results violating constraints are not considered solutions and thus are removed from the analyses. Notably, constraints cannot conflict with each other. In contrast, objectives refer to any parameter which may be desirable but not required to be satisfied (i.e., preferably occur or not occur). Objectives may have quantifiable properties (e.g., "shorter paths are better," "safer paths are better," "paths visiting these designated areas are better," etc.). In various embodiments, preferred solutions may be those which simultaneously maximize/minimize all objectives as appropriate.

The solution generation module 210 is configured to evaluate the input data 220 and generate a plurality of solutions to the problem based on the input data 220. In various embodiments, each of the plurality of solutions may be from distinct homotopy classes. In certain embodiments, the solution generation module 210 includes a reference frame topological graph (RFTG) algorithm configured to leverage a notion of homotopy equivalence of paths to quickly generate a diverse population of solutions.

In various embodiments, the Pareto front approximation module 212 receives as input initial sample data 222 generated by the solution generation module 210. The initial sample data 222 includes the plurality of solutions to the problem.

The Pareto front approximation module 212 evaluates the initial sample data 222 and approximates a Pareto front representing a collection of the plurality of the solutions that are not inferior to others of the plurality of the solutions in view of an entirety of the parameters in the input data 220. In various embodiments, the Pareto front approximate module includes a multi-objective evolutionary algorithm (MOEA) configured for comparing and reducing the quantity of the plurality of solutions. In one embodiment, the Pareto front approximation module 212 includes an NSGA-II algorithm from a pymoo framework.

In various embodiments, the COA generation module 214 receives as input Pareto front data 224 generated by the Pareto front approximation module 212. The Pareto front data 224 includes the approximated Pareto front.

The COA generation module 214 is configured to evaluate the approximate Pareto front data 224 to reduce the approximate Pareto front into a course of action menu that includes a limited quantity of solution architypes. In various embodiments, the COA generation module 214 includes an unsupervised learning program configured to down-select the approximate Pareto front data 224 into a collection of archetypical solutions. In some embodiments, the unsupervised learning program includes a topological clustering algorithm, such as a spectral clustering algorithm. In some embodiments, the COA generation module 214 includes a machine learning algorithm configured to learn based on user selections and execute a trained model configured to autonomously select a COA or rank paths, for example, by anticipated user preference. In some embodiments, the machine learning algorithm may use inverse reinforcement learning techniques.

The COA generation module 214 is configured to generate and transmit COA data 226 to the visual display device 120. In some embodiments, the COA data 226 is displayed as images, text, video, or a combination thereof. In various embodiments, the COA generation module 214 generates a graphic user interface (GUI) on the visual display device 120 and/or provides the GUI. The GUI may provide the solution architypes of the COA data 226 as selectable options. In various embodiments, the visual display device 120 includes a touchscreen display configured for a user to directly contact to interface with and use the GUI, and thereby select a desired one of the displayed solution architypes.

In various embodiments, the decision module 216 receives as input user selection data 228 generated by the user, for example, via a GUI of the visual display device 120 or via the external device 160 through the communication device 140. The user selection data 228 includes the user's selection from the displayed solution architypes of the COA data 226.

The decision module 216 evaluates the user selection data 228 and generates output data 230 that includes and/or is based on the user's selection from the solution architypes of the COA data 226. The output data 230 may be transmitted to and displayed by the visual display device 120. In some embodiments, the decision module 216 may generate and record, in a computer readable storage device or media (e.g., the storage device 130), historic data 232 that includes past selections by the user on the COA menu. In such embodiments, the decision module 216 may analyze the historic data 232 and automatically select one of the solution architypes based on the past selections made by the user and/or provide the historic data 232 to one or more of the other modules to correlate the generated solution architypes to the user's preferences.

Figure 3:
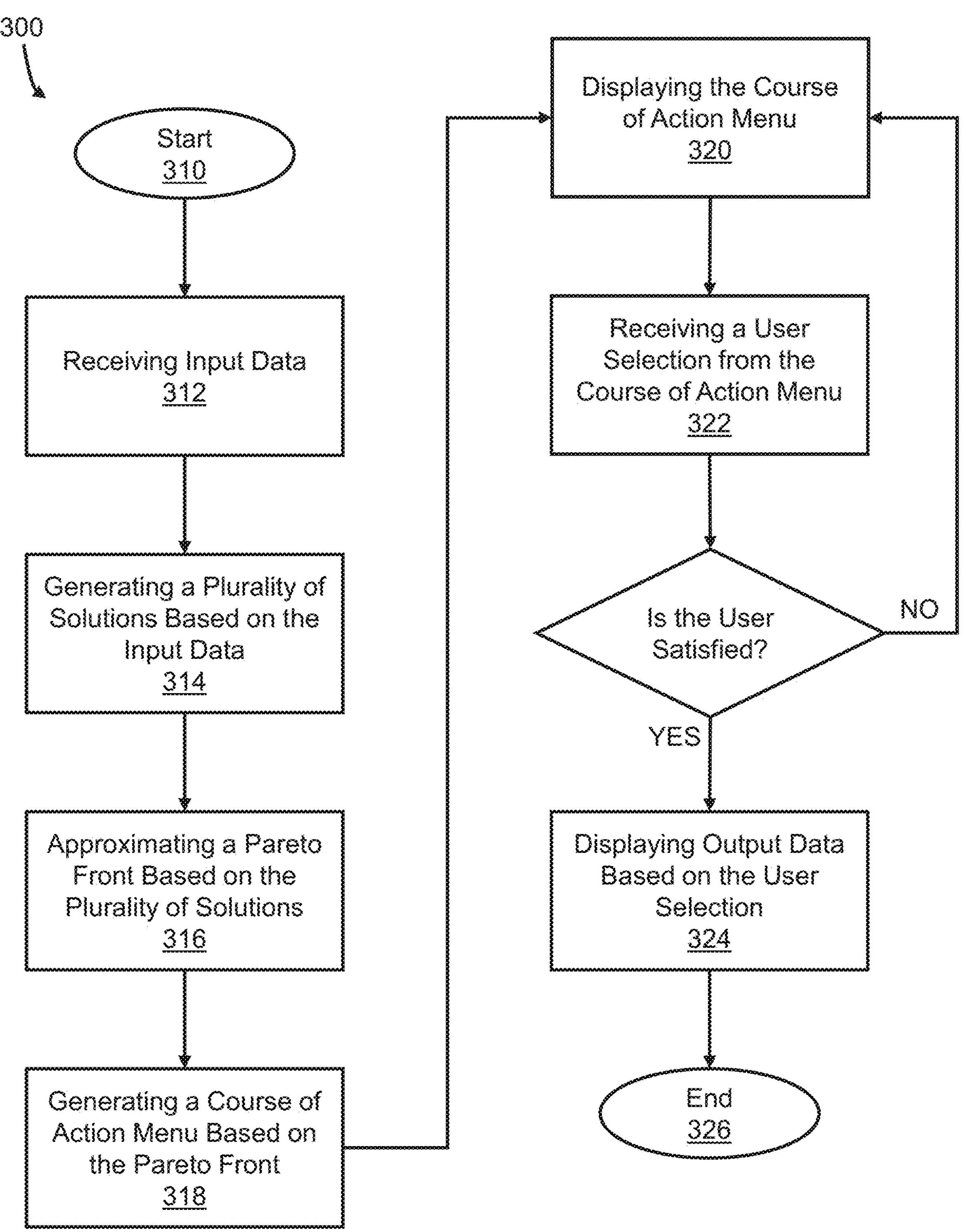
FIG. 3 is flowchart of a process for decision analysis as performed by the system of FIGS. 1 and 2, in accordance with various embodiments.

With reference now to FIG. 3 and with continued reference to FIGS. 1-2, a flowchart provides a method for automated decisions analysis as performed by the system 100, in accordance with exemplary embodiments. As can be appreciated in light of the disclosure, the order of operation within the method is not limited to the sequential execution as illustrated in FIG. 3, but may be performed in one or more varying orders as applicable and in accordance with the present disclosure. In various embodiments, the method can be scheduled to run based on one or more predetermined events, and/or can run continuously during operation of the system 100.

In one example, the method 300 may begin at 310. The input data 220 is received at 312 including parameters of the problem to be solved. A plurality of solutions to the problem are generated at 314 based on the input data 220. The plurality of solutions may be grouped into homotopy classes. A Pareto front is approximated at 316 based on the plurality of solutions. A multi-objective evolutionary algorithm may be implemented to improve the plurality of solutions to approximate the Pareto front. A COA menu is generated at 318 based on the approximate Pareto front. A topological clustering algorithm (e.g., a spectral clustering algorithm) may be used to determine solution architypes of the COA menu. The COA menu is displayed at 320, for example, on the visual display device 120. A user selection from the COA menu is received at 322. If the user is not satisfied, the COA menu may be modified based on the user input. If the user is satisfied, the solution architype selected by the user is used to generate the output data 230 at 324. The output data 230 may be displayed, for example, on the visual display device 120. In some embodiments, the user may be considered satisfied if a path of the COA menu is selected for display, and may be considered to not be satisfied if a request is selected (e.g., request for a specific number of paths, request for similar paths, etc.). The method may end at 326.

FIGS. 4-8 represent aspects of an exemplary application of the system 100 wherein the decision analysis problem is a route planning problem. In particular, the route planning problem relates to a military route planning problem; however, the system 100 and the method are not limited to route planning problems or to military-specific route planning problems. In this example, the problem includes routing a lightly armed ground vehicle on a support mission through a contested environment. The ground vehicle must satisfy a constraint of reaching a desired destination location from a starting location and satisfy certain other constraints such as avoiding obstacles and staying within an operational area. As such, the input data 220 includes the starting location and the destination location, and each of the solutions is a route from the starting location to the destination location.

A multi-objective optimization problem on a space X (called a feasible set) is to jointly maximize a collection of objective functions $u_i$:X→R. In general, simultaneous optimization of all objective functions is impossible if the objective functions conflict with one another (e.g., avoiding a dangerous area may require a long detour). For two feasible points $x_1$, $x_2 \in X$, $x_1$ is considered to dominate $x_2$ if $u_i(x_1) \geq u_i(x_2)$ for all objective functions $u_i$, and the collection of nondominated points is referred to as the Pareto front. Thus, while any point on the Pareto front might be considered a solution to the multi-objective optimization problem, the solution is the full Pareto front. For this example, constraints define the set X where objectives give the functions $u_i$. To ease notation, moving forward an "objective function" refers to a function that is either minimized or maximized, as minimizing one function is equivalent to maximizing its negative.

Evolutionary algorithms require an initial population or sample as input. For some types of decision analysis problems, this is simply a uniform random sample of feasible points. However, this is a nontrivial step for routing planning problems since a space of paths that connect two points is infinite dimensional, and therefore coordinate sampling of a vector representation is impossible. Various prior methods of generating the initial population, for example via Monte-Carlo generation, generally requires significant computations and may produce a nondiverse population.

To overcome this issue, a RFTG algorithm is used to generate the initial population (i.e., a plurality of solutions), that is, paths from distinct homotopy classes between the starting location and the destination location. In this example, the operational area is set as a topological space X and a path as a function f: [0,1]→X. A continuous deformation from a path $f_0$ to a path $f_1$ relative to impassable obstacles (e.g., obstacles 430-434) is a motion that takes points $f_0(\sigma)$ to $f_1(\sigma)$ in a continuous manner without ever passing through any of the obstacles or moving the starting location and the destination location. More precisely, this motion can be represented as a continuous function $f(\tau,\sigma) = f_\tau(\sigma)$: $[0,1]\times[0,1]\rightarrow X$. For each $\tau \in [0,1]$, $f_\tau(\sigma)$ is an intermediate path connecting start and end points.

In this example, the RFTG algorithm is configured to generate paths from distinct homotopy classes. For a 2-dimensional route planning problem, a combinatorial encoding of all homotopy classes is obtained which allows for sampling of paths with built-in diversity guarantees. The path f is considered homotopic to g if there exists a continuous deformation from f to g. Homotopy defines an equivalence relation and thus partitions the space of all paths into homotopy classes of paths which are all homotopic to each other. Paths in the same homotopy class navigate around the obstacles of the operational area in the same way, though they may differ in local navigation. The RFTG algorithm constructs a graph of waypoints dual to the configuration of the obstacles. Specific details of the RFTG algorithm are provided Table 1 below.

TABLE 1

| Algorithm: | RFTG for path generation. |
|---|---|
| Input: | Operational area = X;<br>Obstacles = $B_1, B_2, \ldots, B_k$;<br>Source = s; and<br>Destination = t. |
| Output: | Graph G encoding homotopy classes of paths in X from s to t relative to obstacles $B_1, B_2, \ldots, B_k$. |
| Algorithm Steps: | Define $B = \cup_{i=1}^{k} B_i$; and |
| | Choose points $b_i \in B_i$ and $c \in X - B$. Technicality: no triple $(b_i, b_j, c)$, $(b_i, b_j, s)$, or $(b_i, b_j, t)$ or with $i \neq j$ can be colinear.<br>1. For i = 1, . . . , k, draw line $1_i = \overleftrightarrow{b_i c}$ (Reference Frame). Define segments $l_i^1, l_i^2, \ldots, l_i^{j_i}$ as connected components $l_i - B \cap 1_i$;<br>2. $C$ = connected components of $(X - B) - \cup_{i=1}^{k} 1_i$;<br>3. For $U \in C$, choose $x_u \in U \rightarrow$ vertex set V(G);<br>4. For $x_U, x_V \in V(G)$, create edge $(x_U, x_V)$ for each shared boundary segment $l_i^j$ of U and V; and |

TABLE 1-continued

| Algorithm: | RFTG for path generation. |
|---|---|
| | 5. Update vertex set V(G) = V(G) ∪ {s, t}, and edge set E(G) = E(G) ∪ {(s, $x_U$), (t, xv)} where U ∋ s and V ∋ t. |

The output multigraph G is overlayed in $$X-\bigcup_{i=1}^{k} B_i.$$

The graph encodes paths in the following sense. Any path from s tot can be encoded as a walk (i.e., a sequence of vertices each connected by an edge) in the graph by keeping track of the regions entered and boundary segments crossed in the reference frame. The resulting walk in the graph is unique (after removing trivial redundancies, notably resolving a loop around the reference point c. Two paths which are homotopic produce the same walk on the graph (again after removing redundancies), and two paths which are not homotopic produce different walks on the graph. Thus, generating a set of paths in different homotopy classes reduces to generating distinct walks on the topological graph (using, for example, breath-first search). The results may be limited to paths that do not revisit a vertex (i.e., simple walks) to rule out paths that cross themselves or form a loop. Because the graph is overlayed in the operational area, a walk automatically yields a path.

Figure 4:
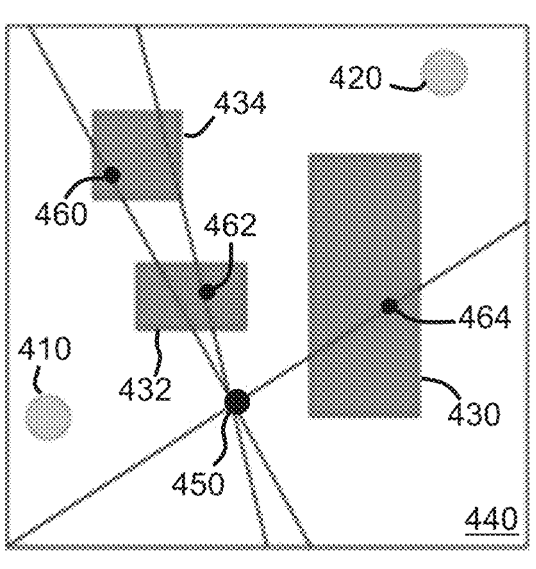
FIGS. 4-7 schematically represent aspects of a reference frame topological graph algorithm as used for generating homotopic paths during a route planning decision analysis process as performed by the system of FIGS. 1 and 2, in accordance with various embodiments.
Figure 5:
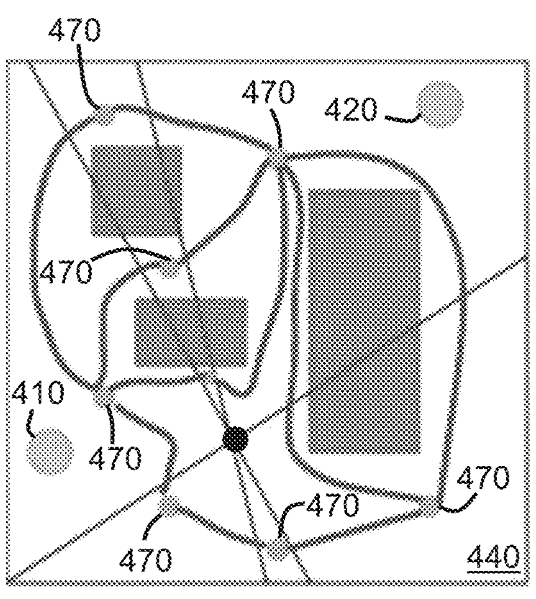
Figure 6:
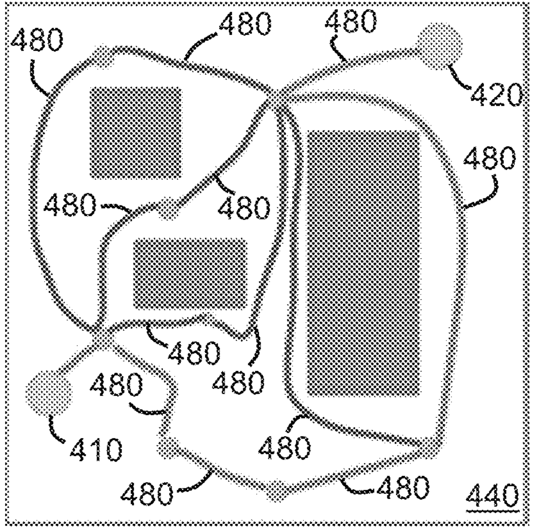
Figure 7:
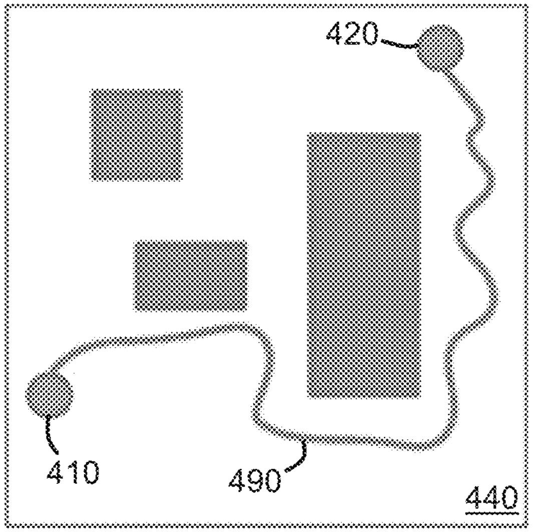

FIGS. 4-6 represent exemplary output from the RFTG algorithm above. FIG. 4 illustrates a reference frame overlayed on an operational area 440. The operational area 440 includes a starting location 410, a destination location 420, obstacles 430, 432, and 434, a reference point 450, obstacle points 460, 462, 464, and vectors extending between the reference point 450 and the obstacle points 460, 462, 464. FIG. 5 illustrates a topological graph, dual to the reference frame, overlayed on the operational area 440 that includes waypoints 470 and simple paths 480 extending between the waypoints 470. FIG. 6 illustrates the paths 480 in the topological graph with the vectors removed. Each of the simple paths 480 in this graph represents a distinct homotopy class. FIG. 7 illustrates a path or route 490 defined by a combination of some of the simple paths 480 extending between the starting location 410 and the destination location 420.

Once the initial population, that is, the plurality of solutions to the problem have been generated, the Pareto front is approximated using a multi-objective evolutionary algorithm (MOEA). MOEAs are inspired by the idea of natural selection. During each generation or cycle, the algorithms are configured to maintain a set of intermediate feasible points (i.e., the population), the best of which are selected and combined with each other to form new members of the population. The best of the old and new population survives to the next cycle. This process repeats until a termination condition is reached. For example, the process may repeat for a defined number of cycles, until the quality of population levels off generation-to-generation, etc. MOEAs provide high quality approximations to the Pareto front relatively quickly. MOEAs only require methods of sampling the solution space to get an initial population (Sampling; obtained with the RFTG algorithm discussed above), evaluating members of the population for solution quality (Evaluation), recombining solutions to get new solutions (Crossover), and in some instances, mutating solutions to provide diversity in the population (Mutation). Sampling, Crossover, and Mutation are problem specific (though standard techniques for finite-dimensional vectors are possible), whereas the evaluation operators are generally problem-agnostic algorithms, as they require only a vector representation of each solution. For this example, the MOEA used for path optimization was based on the industry-standard NSGA-II algorithm from the pymoo framework.

The NSGA-II algorithm determined elite members of the initial population by assigning each member to a specific nondomination level within the solution space. The NSGA-II algorithm selected elite solutions from each nondomination level in order of their crowding distance (i.e., a measure of redundancy in feasible solutions), until reaching a population of the desired size. The MOEA then applied mutation and crossover operations to this population. Specific details of the NSGA-II algorithm are provided below.

TABLE 2

| | |
|---|---|
| Algorithm: | NSGA-II Elitist Nondominated Sorting |
| Input: | Population (Parents ∪ Children) |
| Output: | Elite Members of the Population |
| Algorithm Steps: | 1. Assign rank level based on nondomination.<br>2. Generate sets of nondominated solutions.<br>3. Determine crowding distance of solutions.<br>4. Select Elite members sequentially from each nondomination level in order of crowding distance. |

The MOEA discussed above produced a high-quality approximation to the Pareto front, which could contain as few as a few dozen paths or as many as a few thousand paths (depending on the capability of the available hardware). The problem is then to communicate the types of paths available to a user and facilitate fast COA selection in an operational environment. In this example, each path was associated with its valuation across the objective functions while considering the geometry of the resulting points, thus the computed Pareto front was converted into a point cloud in (n is the number of objectives) which was used for further analysis.

Figure 8:
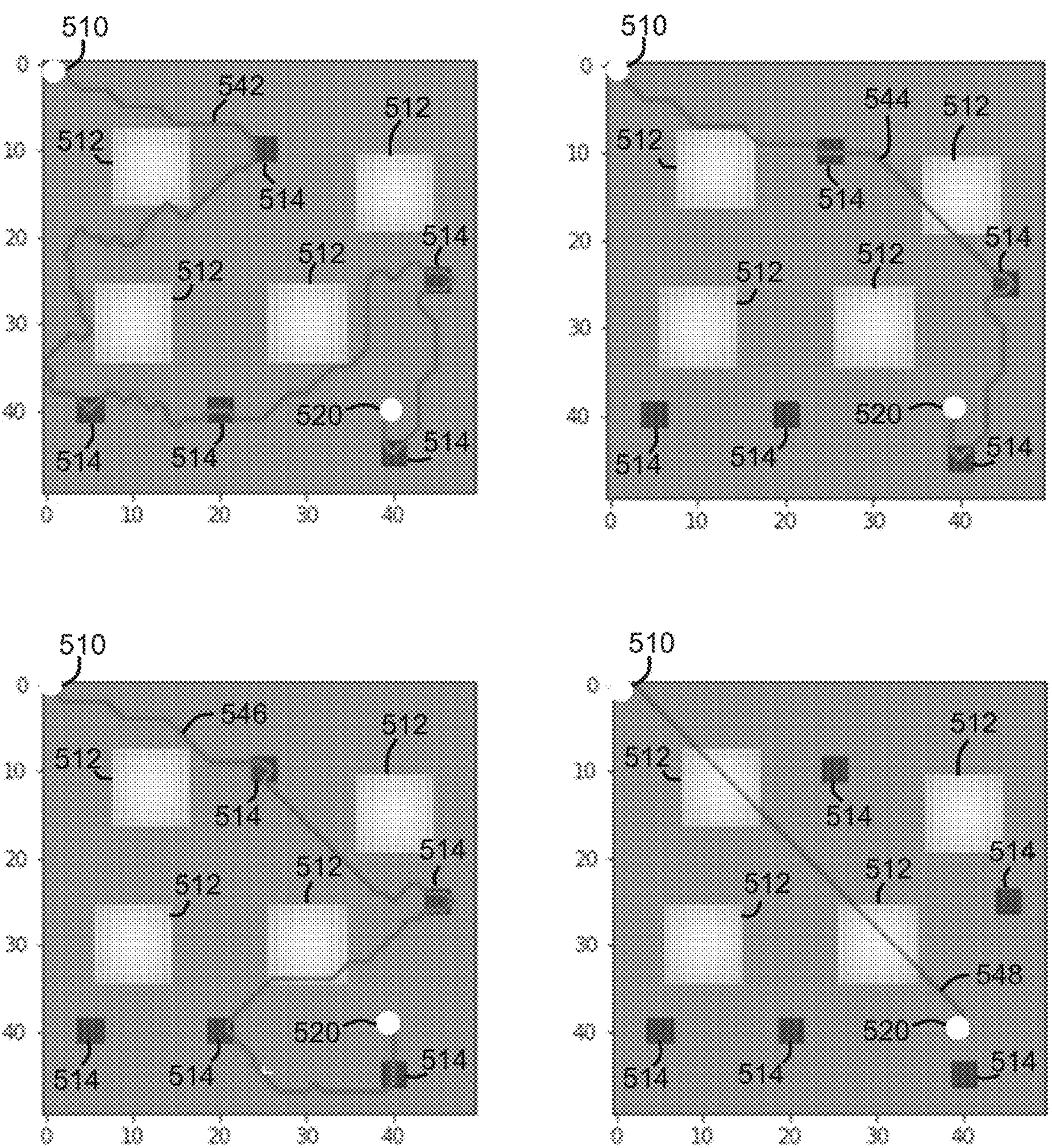
FIG. 8 represents an exemplary course of action (COA) menu generated during a route planning decision analysis process as performed by the system of FIGS. 1 and 2, in accordance with various embodiments.

Path archetypes in a "COA menu" were presented similar to the examples represented in FIG. 8. A topological clustering algorithm, in this instance a spectral clustering algorithm, was used to organize the Pareto front and present the user with a representative from each determined cluster. Spectral clustering relies on minimal assumptions about the distribution of the underlying data, a necessary concession given the unpredictable and highly nonconvex geometry of Pareto fronts in objective space. Spectral clustering methods begin by imposing a graph structure G on the data with edge weights corresponding to similarity between the associated points. From G the graph Laplacian L:=D−A (or a variant) was obtained, where D was the diagonal weighted degree matrix and A was the weighted adjacency matrix (or affinity matrix). The matrix L was positive semidefinite and thus had nonnegative real eigenvalues. Letting $E_k$ denote the matrix with columns given by eigenvectors associated to the smallest k eigenvalues of L. Spectral graph theory states that the kernel of L has a basis of binary vectors separating the connected components of G. Spectral clustering approximates this partition by using the matrix $E_k$ to cut the graph into k components along minimally weighted edges.

These algorithms are highly dependent on the choice of affinity measure. In this example, a variant of Zelnik-Manor and Perona's self-tuning adaptation of the Ng-Jordan-Weiss algorithm was used which features the affinity measure:

$$A_{i,j}(n) = \exp\left(\frac{-d^2(s_i, s_j)}{d(s_i, s_{i,n})d(s_j s_{j,n})}\right) \tag{1}$$

where $s_i$ and $s_j$ were the $i^{th}$ and $j^{th}$ points in the dataset and the points $s_{(j,n)}$ and $s_{(j,n)}$ were the $n^{th}$ closest points to $s_i$ and $s_j$, respectively. This affinity matrix yielded good performance when the natural clusters had different internal spread. The variant Zelnik-Manor and Perona (ZMP) algorithm utilized this affinity on a nearest-neighbors graph, leading to reduced complexity and better performance. Specific details of the AMP algorithm are provided below.

TABLE 3

| | |
|---|---|
| Algorithm: | Nearest Neighbors ZMP Spectral Clustering. |
| Input: | Normalized data S, number of clusters k. |
| Output: | k clusters partitioning S. |
| Algorithm | number of neighbors c, normalization number n. |
| Steps: | Construct c-nearest neighbor directed graph G for S. |
| | Affinity matrix A := $(A_{i,j}(n))_{(si,\ sj) \in E(G)\ or\ (sj,\ si) \in E(G)}$. |
| | D := weighted degree matrix from row sums of A. |
| | Graph Laplacian L := D − A. |
| | Compute the matrix $E_k$ of the eigenvectors corresponding to the k smallest eigenvalues of L. |
| | Cluster the rows of $E_k$ and return the results. |

Since the spectral clustering algorithm had the potential to provide an unpractical quantity of clusters in the COA menu, the system 100 allowed for the user to request a COA menu of a given size and this quantity was selected as the number of clusters to be presented.

FIG. 8 presents output of a request for a COA menu of size four using the MOEA with a population size 300 to approximate the Pareto front. The spectral clustering algorithm was run with 20 nearest neighbors and a normalization number of seven. Several "engagement areas" 512 are identified which the vehicle attempts to avoid, and there are several potential secondary support missions in designated "support areas" 514. A goal of the problem is to minimize overall travel time and risk (represented by time in engagement areas 512) while maximizing time spent in support areas 514. The paths 542, 544, 546, and 548 presented show the user four path archetypes for consideration, from a short and risky path 548 (bottom right) to a meandering path 542 (top left) that completes all secondary objectives. The user may select a path or route 542-548 from this menu, either to follow directly or to direct another manned or unmanned asset to follow. In some embodiments, the system 100 may include interactive methods, that allow the user to request more paths or routes with given properties (e.g., within the same cluster).

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for automated route planning comprising: a processor and memory storing instructions that, when executed, cause the processor to:

receive input data relating to a route planning problem for navigating through an operational area containing obstacles, the input data including a starting location, a destination location, obstacle locations, and operative parameters including at least one safety constraint and at least one mission objective, wherein at least two of the operative parameters are in conflict such that improving a first of the at least two operative parameters degrades a second of the at least two operative parameters;

generate an initial population of candidate routes by applying a reference frame topological graph (RFTG) algorithm that:

selects obstacle points and a reference point in the operational area;

constructs reference frame lines extending from each obstacle point through the reference point;

partitions the operational area into connected regions separated by the reference frame lines and the obstacles;

generates a topological graph having vertices representing the connected regions and edges representing boundary segments between adjacent connected regions; and generates a plurality of candidate routes, each candidate route corresponding to a distinct walk through the topological graph from the starting location to the destination location, wherein each distinct walk represents a different homotopy class that navigates around the obstacles in a topologically different manner;

approximate a Pareto front using a multi-objective evolutionary algorithm (MOEA) that iteratively evaluates and selects routes from the initial population based on the operative parameters, wherein the Pareto front represents routes that balance tradeoffs between the at least two operative parameters that are in conflict;

apply a spectral clustering algorithm to the Pareto front to:

construct an affinity matrix representing similarities between routes in the Pareto front;

calculate a graph Laplacian from the affinity matrix;

determine eigenvectors corresponding to smallest eigenvalues of the graph Laplacian; and partition the Pareto front into a predetermined number of clusters, wherein each of the clusters represents a route archetype;

generate a graphical user interface displaying at least one representative route from each cluster as a selectable navigation option; and display the graphical user interface on a visual display device.

2. The system of claim 1, wherein the at least one safety constraint must be satisfied by each of the candidate routes of the initial population and the at least one omission objective is preferably satisfied but not required by each of the candidate routes of the initial population.

3. The system of claim 1, wherein the processor is configured to approximate the Pareto front using an NSGA-II algorithm and wherein the affinity matrix is constructed using a self-tuning affinity measure based on a distance between a first route solution vector and a second route solution vector in an objective space defined by the operative parameters.

4. The system of claim 1, wherein the processor is configured to generate the graphical user interface, at least in part, using a trained machine learning algorithm that is pre-trained on past user selections.

5. The system of claim 1, wherein the processor is configured to:

record historic data including past selections made by a user on the graphical user interface on a computer readable storage device; and automatically select one of the representative routes or rank the representative routes based on the past selections made by the user.

6. The system of claim 1, further comprising, by the processor:

generating output data based on a selected one of the representative routes, the output data including the selected one of the representative routes and information relating to the operative parameters of the input data as applied to the selected one of the representative routes; and displaying, on the visual display device, the output data.

7. A method for automated route planning comprising:

receiving, by a processor, input data relating to a route planning problem for navigating through an operational area, the input data including a starting location, a destination location, and operative parameters wherein at least two of the operative parameters are in conflict such that improving a first of the at least two operative parameters degrades a second of the at least two operative parameters;

generating, by the processor, an initial population of candidate routes by applying a reference frame topological graph (RFTG) algorithm that:

defines a set of reference frames extending from obstacles within the operational area;

generates a topological graph comprising vertices representing regions separated by the reference frames and edges representing boundaries between the regions; and generates a plurality of candidate routes by performing distinct walks through the topological graph, wherein each distinct walk corresponds to a distinct homotopy class;

approximating, by the processor, a Pareto front using a multi-objective evolutionary algorithm (MOEA) that iteratively evaluates and selects routes from the initial population based on the operative parameters, wherein the Pareto front represents routes that balance tradeoffs between the at least two operative parameters that are in conflict;

applying, by the processor, a spectral clustering algorithm to the Pareto front to:

construct an affinity matrix representing similarities between routes in the Pareto front;

calculate a graph Laplacian from the affinity matrix;

determine eigenvectors corresponding to smallest eigenvalues of the graph Laplacian; and partition the Pareto front into a predetermined number of clusters, wherein each of the clusters represents a route archetype;

generate, by the processor, a graphical user interface displaying at least one representative route from each cluster as a selectable navigation option; and displaying the graphical user interface on a visual display device.

8. The method of claim 7, wherein the operative parameters of the input data include at least one safety constraint that must be satisfied by each of the candidate routes of the initial population, and at least one mission objective that is preferably satisfied but not required by each of the candidate routes of the initial population.

9. The method of claim 7, wherein approximating the Pareto front includes using an NSGA-II algorithm and wherein the affinity matrix is constructed using a self-tuning affinity measure based on a distance between a first route solution vector and a second route solution vector in an objective space defined by the operative parameters.

10. The method of claim 7, wherein generating the graphical user interface includes using a trained machine learning algorithm that is pre-trained on past user selections.

11. The method of claim 10, further comprising, by the processor:

recording, in a computer readable storage device, historic data including past selections made by a user on the graphical user interface; and automatically selecting one of the representative routes or ranking the representative routes based on the past selections made by the user.

12. The method of claim 7, further comprising, by the processor:

generating output data based on a selected one of the representative routes, the output data including the selected one of the representative routes and information relating to the operative parameters of the input data as applied to the selected one of the representative routes; and displaying, on the visual display device, the output data.

* * * * *